United States Patent [19]

Augusti et al.

[11] Patent Number: 4,789,901
[45] Date of Patent: Dec. 6, 1988

[54] DIGITAL READING DEVICE FOR FACSIMILE APPARATUS

[75] Inventors: Ferdinando Augusti, Turin; Luigi Bonatto, Ivrea; Anna M. Puglisi, Naples, all of Italy

[73] Assignee: Ing. C. Olivetti & Co., S.p.A., Turin, Italy

[21] Appl. No.: 858,743

[22] Filed: May 2, 1986

[30] Foreign Application Priority Data

May 5, 1985 [IT] Italy ................. 67406 A/85

[51] Int. Cl.$^4$ ............................................. H04N 1/40
[52] U.S. Cl. ................................. 358/284; 358/166; 358/225; 382/54
[58] Field of Search ............... 358/200, 282, 284, 166, 358/225; 382/54

[56] References Cited

U.S. PATENT DOCUMENTS

| | | | |
|---|---|---|---|
| 3,471,638 | 10/1969 | De Groat | 358/284 |
| 3,566,027 | 2/1971 | Paine | 358/166 |
| 3,588,331 | 6/1971 | Vermillion | 358/284 |
| 3,622,699 | 11/1971 | Richeson, Jr. | 358/284 |
| 3,845,242 | 10/1974 | Richeson, Jr. et al. | 358/284 |
| 4,342,050 | 7/1982 | Traino | 358/256 |
| 4,495,404 | 1/1985 | Carmichael | 219/281 |
| 4,589,034 | 5/1986 | Yokomizo | 358/282 |
| 4,605,971 | 8/1986 | Kimura | 358/285 |

FOREIGN PATENT DOCUMENTS

EP0201234 4/1984 European Pat. Off. .

Primary Examiner—Edward L. Coles, Sr.
Attorney, Agent, or Firm—Banner, Birch, McKie & Beckett

[57] ABSTRACT

The line of a document is focused onto a series of reading elements, such as the cells of a charge coupled device, from which a serial output signal is obtained and applied to an analogue-to-digital converter. In order to compensate for the fall-off in the transfer function of the objective and the said elements at high spatial frequencies, the signal is processed, before A/D conversion, by a multi-stage filter (27), comprising an adjustable band pass stage (36) for setting the zero level, an adjustable band pass stage (41) for setting the output level and an intermediate band pass stage (38) with unity gain, which eliminates sampling noise. Matching is provided by an input, low pass filter, emitter follower stage (33) and an output, high pass filter, emitter follower stage (43).

4 Claims, 2 Drawing Sheets

és 4,789,901

DIGITAL READING DEVICE FOR FACSIMILE APPARATUS

BACKGROUND OF THE INVENTION

The present invention refers to a digital reading device for reading documents to be transmitted by facsimile apparatus comprising an objective for focusing the image of a line of a document on to a series of reading elements which generate a series of signals in response to the points read on the line, an A/D converter for the said signals, and a circuit for amplification and filtering of the signals arranged between the reading elements and the converter. In known apparatus of the type in which the reading elements are constituted by cells of a CCD (Charge Coupled Device) sensor, the amplitude of the signal generated by these elements falls off at high spatial frequencies, both because of the modulation transfer function (MTE) of the objective and because of the MTF of the CCD.

SUMMARY OF THE INVENTION

The object of the invention is to provide a reading device in which this fall-off is eliminated.

To this end, in a device according to the invention we now provide a digital reading device for facsimile apparatus of the above type, wherein the said circuit is adapted to compensate for response of the objective and of the reading elements at the various spatial frequencies of the said points, in order to generate the said signals with an amplitude independent of the spatial frequency.

BRIEF DESCRIPTION OF THE DRAWINGS

The invention will be described in more detail by way of example, with reference to the accompanying drawings, in which: –

DETAILED DESCRIPTION OF THE PREFERRED EMBODIMENT

Figure 1:
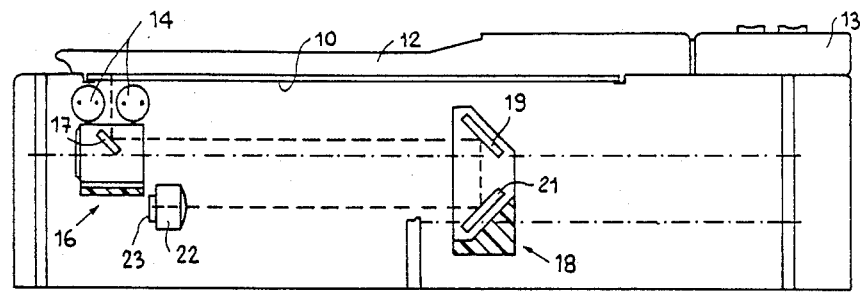
FIG. 1 is an outline drawing of an apparatus for transmission and/or reproduction of images, (facsimile apparatus), incorporating a digital reading device embodying the invention.

With reference to FIG. 1, a transparent support plate 10 for a document to be read is fixed and is covered by a hinged cover 12, adapted to hold the document in contact with the plate 10. Adjacent to the cover 12 there is located a keyboard 13 for controlling the digital reader. The latter comprises two fluorescent lamps 14, carried by a first carriage 16 which is movable transversely in order to explore the whole length of the document, in a manner known in itself.

The carriage 16 carries a mirror 17 inclined at 45°, so as to reflect the image of the elementary line of the document, as indicated by the broken line in FIG. 1.

The reader in addition comprises a second carriage 18 carrying a pair of mirrors 19 and 21 inclined 45° in opposite directions, so as to reflect the optical beam 180° towards an objective 22, which focuses this beam on to a series of reading elements 23 constituted by the cells of a charge coupled device (CCD).

The cells of the CCD 23 are so spaced that each element can receive the light reflected by a small area of the document, called a pixel. The number of pixels per mm, in general between 3 and 12, determines the horizontal resolution of the reading device. The number of elementary lines per mm, read on the document, on the other hand determines the vertical resolution of the reader. An image can be considered as formed by black and white pixels. The density of points, for example white ones, in an elementary line determines the spatial frequency of the respective pixels. This frequency is maximum when the cells of the CCD of the line receive alternately signals of white points and of black points.

Figure 2:
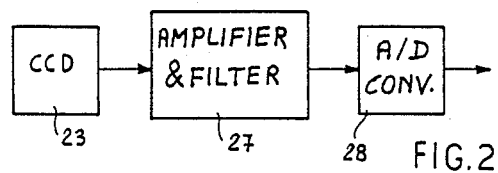
FIG. 2 is a block diagram of the circuit for generating the signals of the reading device.

The cells of the CCD generate electrical signals which are sent serially to a circuit 27 (FIG. 2) for filtering and amplification. For this purpose the cells of the CCD 23 are associated with a sampling circuit of the sample and hold type (not shown), which effects the sampling at the scanning frequency of the cells. The output signal from the circuit 27 is sent to analogue-digital converter 28 and can then be coded, transmitted, stored and/or reproduced on paper.

Figure 3:
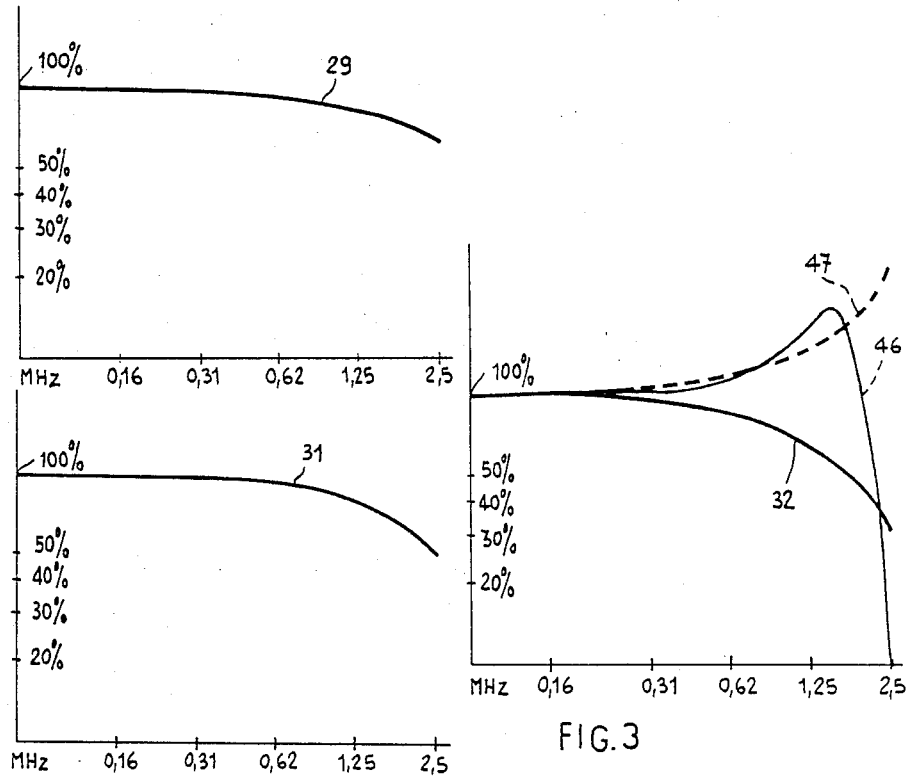
FIG. 3 is diagrams of the MTF of the various components of the circuit of FIG. 2.

It is known that the relationship between the optical intensity received by the objective 22 (FIG. 1) and that transferred from it, known as the modulation transfer function (MTF) of the objective, varies with spatial frequency of the signals. In FIG. 3 the curve 29 shows on a logarithmic scale the MTF of the objective as a function of the spatial frequency. The curve 29 shows that the fall-off of the MTF for the maximum spatial frequency in which the pixels are alternately white and black is about 30%. The curve 31 shows on the other hand the MTF of the CCD and demonstrates that the fall-off of the respective MTF for the maximum spatial frequency is about 50%. This fall-off is due to interaction between the contiguous cells of the CCD 23 and leakage of charge in the cells of the CCD 23.

In FIG. 3 the curve 32 shows the combined effect of the two curves 29 and 31, with a maximum fall-off of the overall MTF down to about 30%.

According to the invention, the circuit 27 (FIG. 2) is provided so as to compensate for the combined effect of the fall-off of the MTF of the objective and of the MTF of the CCD. In particular, the circuit 27 matches the response of the objective and the CCD to the various spatial frequencies, emphasising in amplitude the appropriate signal at high frequencies. The circuit 27 further amplifies this signal in voltage and in current so as to bring it to a value suitable for the conversion into a digital signal by the converter 28.

In particular the circuit 27 comprises a first stage 33 (FIG. 4) constituted by an amplifier 34 of the emitter-follower type, in which a capacitor C1 provides the function of a low-pass filter. The stage 33 is linked to a second filtering stage 36, comprising an operational amplifier 37 with a voltage gain of 5. An input of the amplifier 37 is coupled to the amplifier 34 through a high-pass filter C3, while its output is coupled to the same input by a low-pass filter C4, whereby the stage 36 has the function of a 6 dB band pass fitler. The other input of the amplifier 37 is coupled to an adjustable resistance T1, which can be adjusted to cancel the continuous component of the CCD signal. Thus the offset of 7 volts in the signal of the CCD is cancelled to bring the level of absence of signal to 0 v.

The output of the amplifier 37 is coupled to another filter stage 38, known as a modified second order Butterworth filter. This comprises an operational amplifier 39 with unitary voltage gain. An input of the amplifier 39 is coupled to the output of the amplifier 37 by a high-pass filter C6, while two capacitors C5 and C7 create a low-pass filter, whereby the stage 38 has the function of a 12 dB band pass filter. This contributes substantially to eliminating the noise of the CCDs generated by the superimposition of the sampling signals.

The output of the amplifier 39 is coupled to a further stage 41, which comprises another operational amplifier 42 with voltage gain from 2 to 6. The output voltage is adjustable by means of a variable resistance T2, in order to adapt to the value suitable for the A/D conversion. The input of the amplifier 42 is coupled to the amplifier 39 by a high-pass filter C8 with feedback through a low-pass filter C9, whereby the stage 41 also acts as a 6 dB band pass filter. Finally the output of stage 41 is coupled through a high-pass filter C10 to a stage 43 comprising an amplifier 44 of the emitter-follower type.

Figure 4:
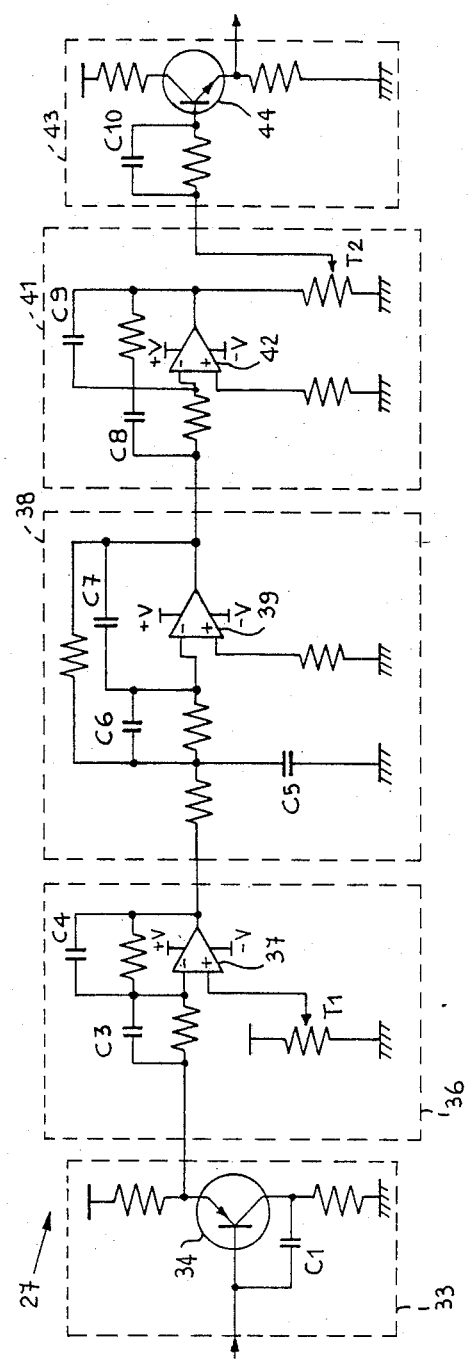
FIG. 4 is a detailed diagram of the circuit of FIG. 2.

FIG. 3 shows the equalisation graph 46 of the MTF obtained with the circuit of FIG. 4. It can be seen that this substantially coincides with the ideal graph 47 complementary to the graph 32, up to a frequency of 1.4 MHz which corresponds to a spatial frequency of about 20 pixel/mm. Above this frequency the curve 46 falls off rapdily, but these spatial frequencies are of no practical interest.

Figure 5:
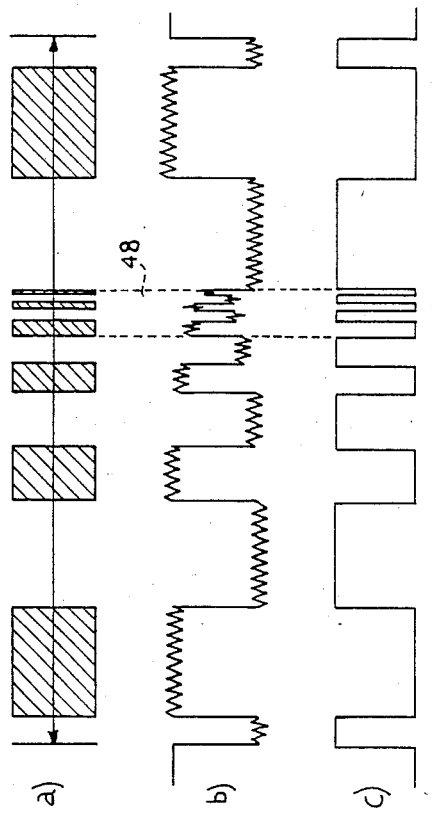
FIG. 5 is a diagram of the signals generated by the sensor.

In FIG. 5 in line (a) there are shown on a much enlarged scale the pixels of a part of an elementary scanning line. In line (b) there is shown the unfiltered signal emitted by the CCD, i.e. the signal entering stage 33 (FIG. 4). It can be seen that the lower level of the signal (b) (FIG. 5), due to the reading of the white pixels, and the higher level, due to the reading of the black pixels, are serrated because of the noise of the signal caused by sampling. It can further be seen that corresponding to the zone 48, where the spatial frequency is greater, the amplitude of the signal is noticeably reduced.

In line (c) on the other hand there is shown the filtered signal issuing from stage 43. This shows how the noise of the CCD has disappeared and the recovery in amplitude of the signal in the zone 48. The inversion of polarity of the signal of line (c) with regard to line (b) is due to the uneven number of stages of inverting amplification which constitute the filter.

We claim:

1. A digital reading device for facsimile apparatus, comprising an objective for focusing an image of a line of a document formed of a plurality of points on to a series of reading elements which generate a series of analog signals in response to the points read on the line, said points having various spatial frequencies, an A/D converter, and a circuit for amplification and filtering of said analog signals arranged between said reading elements and said converter, wherein said circuit is operable to compensate for response of the objective and of the reading elements at the various spatial frequencies of the said points, and wherein said circuit is a multistage circuit comprising an amplification and filtering stage having such a modulation transfer function as to effect the compensation by emphasizing the analog signals due to the response of said objective and said reading elements at the high spatial frequencies of said points within a predetermined range of frequencies, whereby the fall-off in amplitude of said analog signal at such high spatial frequency is compensated as to supply to said converter output analog signals with an amplitude independent of said spatial frequency.

2. A device according to claim 1, in which the said elements (23) are constituted by the cells of a charge coupled device (CCD) having a plurality of cells which furnish an output level having a constant component, characterized in that the said circuit (27) comprises a also a first positive gain band pass stage (36) connected between said CCD and said amplification and filtering stage for eliminating said constant component of the analog signal generated by said CCD, said first stage being adjustable.

3. A device according to claim 2, characterized in that the filter comprises a second positive gain band pass stage (41) connected between said amplification and filtering stage and said converter and adjustable for defining an output level of the signal.

4. A device according to claim 3 characterised in that the said circuit (27) comprises an emitter-follower stage (33) with low-pass filter action between the CCD (23) and the first stage (36) and an emitter-follower stage (43) with high-pass filter action between the second stage (41) and the converter (28).

* * * * *